United States Patent [19]
Jozwiak

[11] 4,252,401
[45] Feb. 24, 1981

[54] PARALLEL OPTICAL SCANNING DEVICE

[75] Inventor: Joseph E. Jozwiak, Paris, France

[73] Assignee: Societe Anonyme de Telecommunications, Paris, France

[21] Appl. No.: 52,507

[22] Filed: Jun. 27, 1979

[30] Foreign Application Priority Data

Jul. 7, 1978 [FR] France ................ 78 20272

[51] Int. Cl.³ .................. G02B 27/17; G02B 15/00
[52] U.S. Cl. .......................... 350/6.4; 350/424
[58] Field of Search ............. 350/6.1, 6.2, 6.4, 182, 350/184, 185, 194, 285, 286, 287; 358/204, 205, 206

[56] References Cited

U.S. PATENT DOCUMENTS 3,010,366  11/1961  Crawford .................. 350/194
3,083,611  4/1963   Ziolkowski et al. ......... 350/6.4

FOREIGN PATENT DOCUMENTS 332207  10/1928  United Kingdom ............ 350/185

Primary Examiner—Alfred E. Smith
Assistant Examiner—Janice A. Howell
Attorney, Agent, or Firm—Holman & Stern

[57] ABSTRACT

A parallel optical scanning device, of the type comprising two prisms of small apex angle which rotate in opposite directions at the same speed about a common axis, wherein each of the prisms is composed of two coaxial parts secured to each other and arranged to produce different beam deviations.

7 Claims, 2 Drawing Figures

U.S. Patent     Feb. 24, 1981     4,252,401

PARALLEL OPTICAL SCANNING DEVICE

The present invention relates to a parallel optical scanning device, of the type comprising two prisms of small apex angle which rotate in opposite directions at the same speed about a common axis. Such a device is known as a diasporameter.

The deviation of optical beams by the prisms, hence the extent of the scanned field depend on the apex angle of each prism and on the refraction index of the material of the prisms.

It is desirable in some applications to achieve the space exploration simultaneously with two fields of different amplitudes. This is particularly the case in missile guidance, where there must be a field of high amplitude for the acquisition of the missile and a field of lesser amplitude, allowing a greater precision, for cruising.

The object of the invention is to provide a scanning device of the type described hereinabove, which achieves space exploration with two fields of different amplitudes simultaneously.

According to the invention, each of the prisms is composed of two coaxial parts secured to each other and arranged to produce different beam deviations.

These different deviations may be obtained either by providing different apex angles for the two parts, or by using materials having different refraction indices for the two parts, or by suitably combining different apex angles and different indices.

Figure 1:
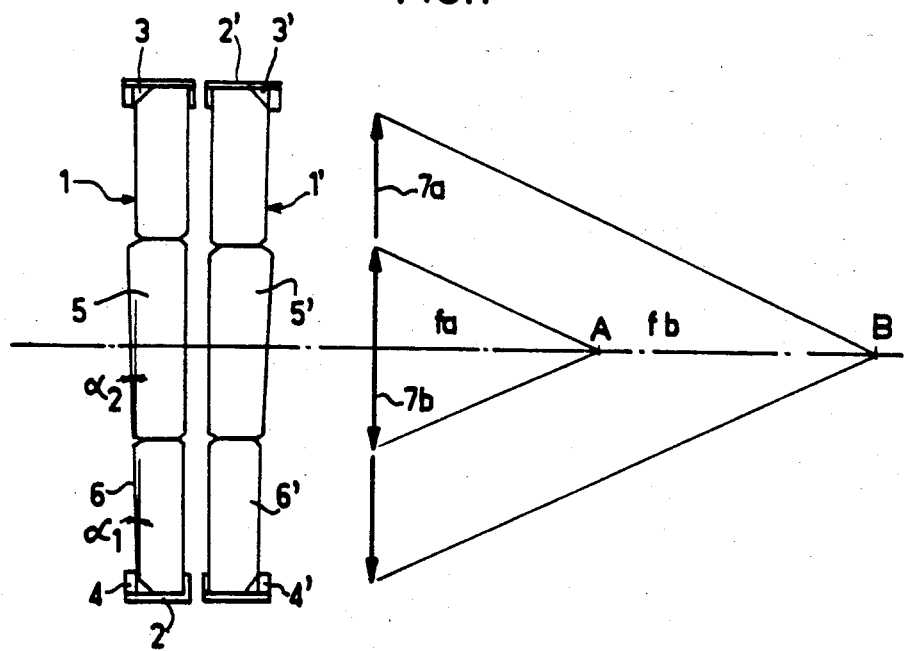
Figure 2:
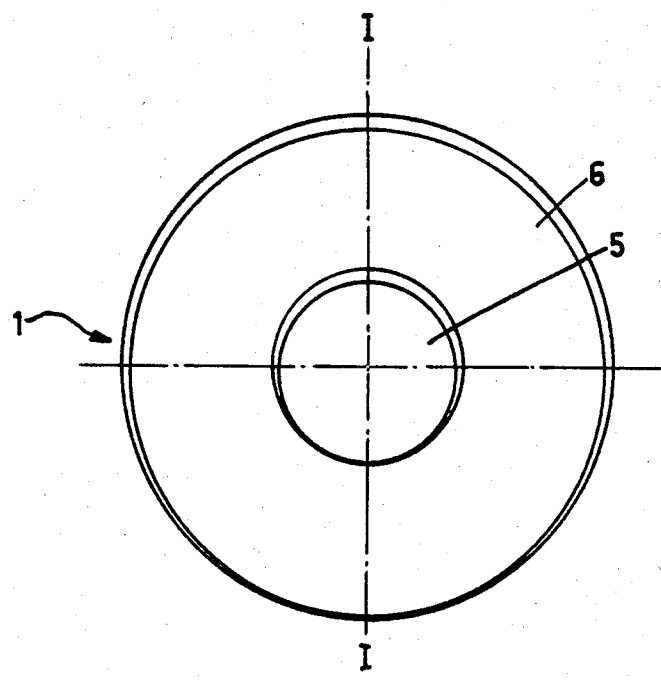

The invention will be more readily understood on reading the following description with reference to the accompanying drawings, in which:

FIG. 1 schematically shows an embodiment of the scanning device according to the invention, and FIG. 2 shows in front view one of the prisms of the device according to FIG. 1.

Referring now to the drawings, the scanning diasporameter shown in FIG. 1 comprises two identical prisms 1,1', mounted so as to rotate in opposite directions about a common axis. The prisms are conventionally supported by respective barrel members 2,2' housed in a fixed structure (not shown). Drive and transmission means (not shown) enable the barrel members 2,2' to be driven in opposite directions at the same speed. The positioning of the prisms 1,1' is ensured by shims 3,3' clamped by threaded washers 4,4'.

In the shown embodiment, each prism is composed of two coaxial prismatic parts, namely a central part 5 (resp. 5') and a peripheral part 6 (resp. 6') having different apex angles. The central part 5 has an apex angle $\alpha_2$ larger than the apex angle $\alpha_1$ of the peripheral part. It will be noted in this respect that, in the drawing, the apex angles have been highly exaggerated for the sake of clarity. The refraction index being assumed to be the same for the two parts, the field scanned by the central parts 5,5' in the course of their rotation is greater than that scanned by the peripheral parts 6,6', the amplitude of the scanned fields being directly a function of the respective apex angles.

Two superposed fields, of different amplitudes, are thus obtained.

It has been indicated hereinabove that the apex angle $\alpha_2$ of the central part 5 was larger than the apex angle $\alpha_1$ of the peripheral part 6, but the opposite is also possible, namely $\alpha_2$ being smaller than $\alpha_1$.

The diasporameter described so far is associated with a suitable optical device, namely a bifocal monopupil 7 comprising a part 7a with a focus A and a part 7b with a focus B, the ratio of the focal distances $f_a$ and $f_b$ being equal to the ratio of the amplitudes of the fields respectively scanned by the prism parts 5, 5' and 6,6'.

To assemble parts 5 and 6, it is proceeded as shown in FIG. 2. The two parts are aligned along the line of greatest inclination I—I, and they are joined by adhesion. However, it should be added that the alignment along the line of greatest inclination is not critical and that another configuration may be chosen. However, the configuration described is the simplest one.

In a modification, not shown, the two coaxial parts have the same apex angle, but are constituted by materials of which the refraction indices differ. The definition of the materials to be used for obtaining the desired scanned fields is within the scope of one skilled in the art.

It should be added that the two preceding embodiments may very well be combined, and it may be provided that the two coaxial parts have different apex angles and are constituted by materials having different refraction indices.

The diasporameter according to the invention will be employed advantageously as a scanning device in a system including two optical channels used simultaneously, as for example for guiding missiles, where the two optical channels are respectively adapted to the taking over or acquisition phase of the missile, where a large field is necessary, and to the cruising phase, where the precision must be excellent and therefore the field smaller.

By way of example, the acquisition field, of a few tens of milliradians, is 3 to 4 times greater than the cruising field.

What I claim is:

1. A parallel optical scanning device, of the type comprising two prisms of small apex angle which rotate in opposite directions at the same speed about a common axis, wherein each of the prisms is composed of two coaxial parts, a central part and a peripheral part, secured to each other and arranged to produce different beam deviations.

2. A device according to claim 1, wherein the two parts have the same refraction index and different apex angles.

3. A device according to claim 2, wherein the central part has a larger apex angle than that of the peripheral part.

4. A device according to claim 2, wherein the central part has an apex angle smaller than that of the peripheral part.

5. A device according to claim 1, wherein the coaxial parts are constituted by materials having different refraction indices.

6. A device according to claim 5, wherein the coaxial parts have identical apex angles.

7. A device according to claim 1, wherein the central part and the peripheral part have respective lines of greatest inclinations which are aligned.

* * * * *